United States Patent [19]

Hennells

[11] 4,026,533
[45] May 31, 1977

[54] SHOCK ABSORBER WITH CONICAL CONTROL ELEMENTS

[76] Inventor: Ransom J. Hennells, 45500 N. Territorial Road, Plymouth Township, Wayne County, Mich. 48170

[22] Filed: Aug. 29, 1975

[21] Appl. No.: 608,885

[52] U.S. Cl. .............................. 267/124; 267/65 R; 188/287
[51] Int. Cl.² .......................................... F16F 9/48
[58] Field of Search ............ 267/65 R, 65 D, 64 A, 267/64 R, 120, 124; 188/287, 288, 318, 322; 293/1, DIG. 2

[56] References Cited

UNITED STATES PATENTS

| 3,176,972 | 4/1965 | Deschner | 188/287 |
| 3,750,856 | 8/1973 | Kenworthy | 188/287 |
| 3,782,710 | 1/1974 | Selke et al. | 267/65 R |
| 3,864,922 | 2/1975 | Dial et al. | 267/65 R |

Primary Examiner—James B. Marbert

Attorney, Agent, or Firm—Woodhams, Blanchard and Flynn

[57] ABSTRACT

An adjustable energy absorber including a housing having a ram slidably extending therefrom. A first control sleeve divides the housing into a pair of fluid chambers, which sleeve has an axially extending row of openings to provide communication between the two chambers. A second control sleeve surrounds the first sleeve and is nonrotatably connected thereto. The first and second sleeves have compatible outer and inner conical surfaces, respectively. The first and second sleeves are axially adjustable with respect to one another to form a narrow flow passage between the opposed conical surfaces. Imposition of a force on the ram causes fluid to be forced from one chamber through the openings into the flow passage, and then into the other chamber. By varying the width of the flow passage, as by axially moving one control sleeve relative to the other, the amount of energy absorbed by the fluid during the movement of the ram can be selectably adjusted.

17 Claims, 8 Drawing Figures

U.S. Patent  May 31, 1977  Sheet 1 of 2  4,026,533
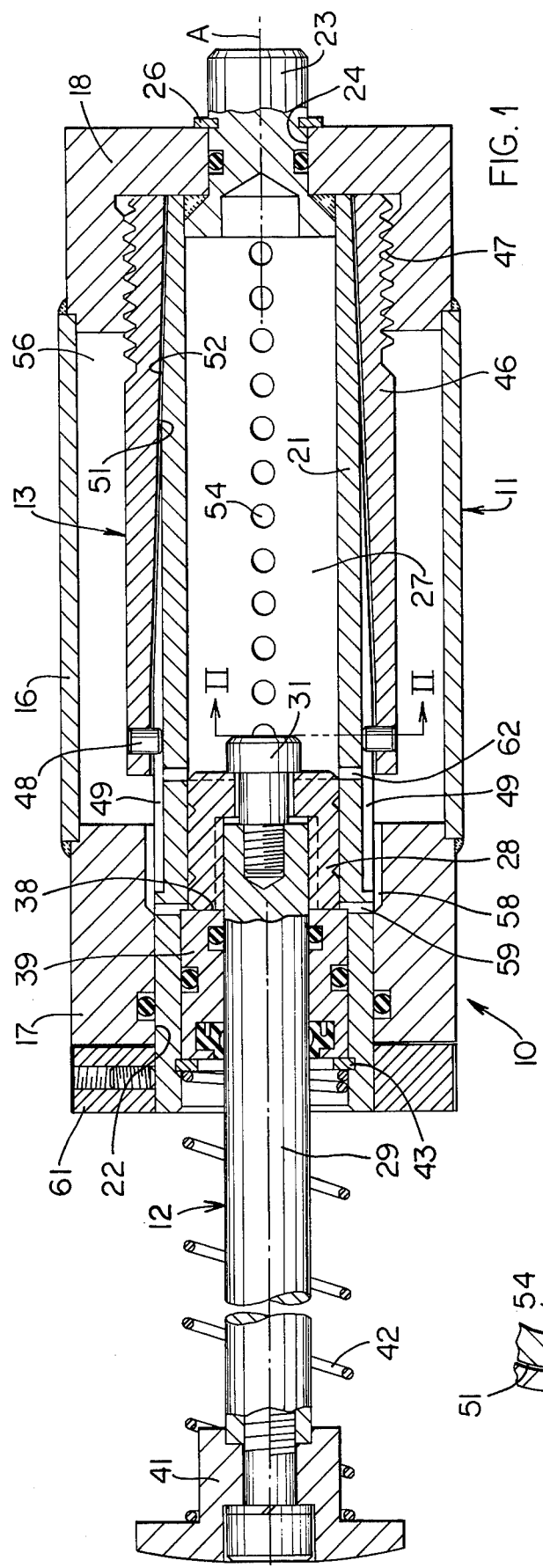
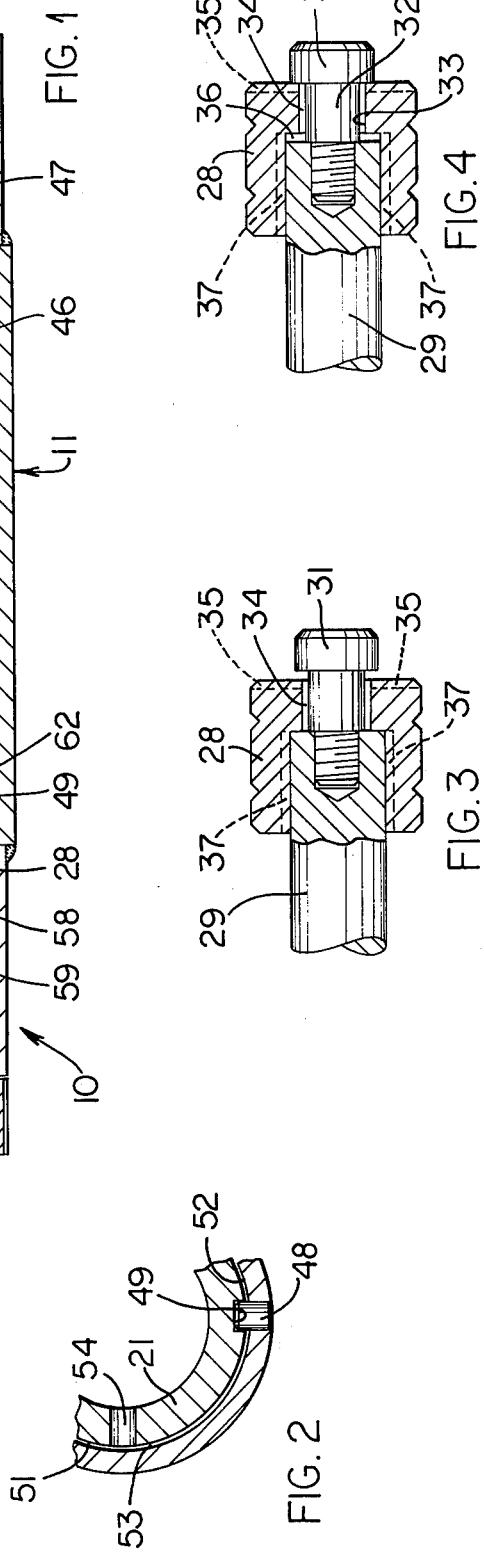

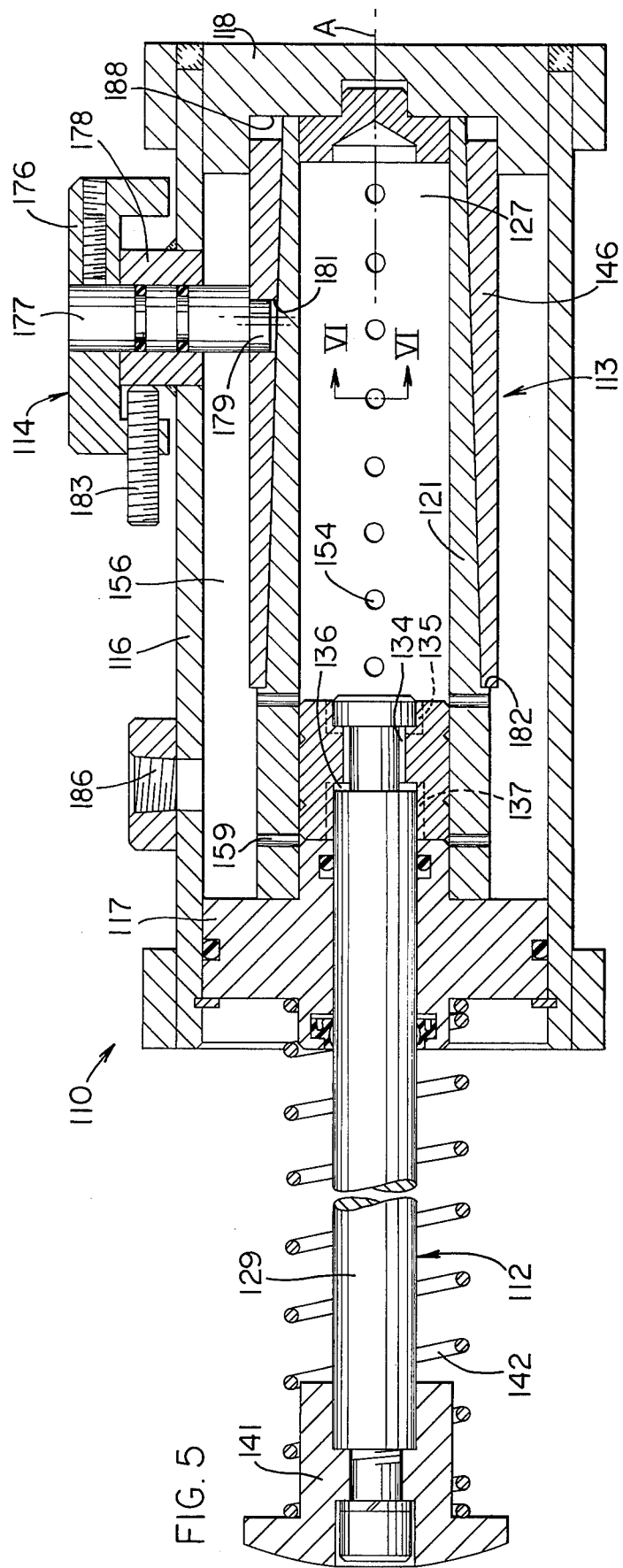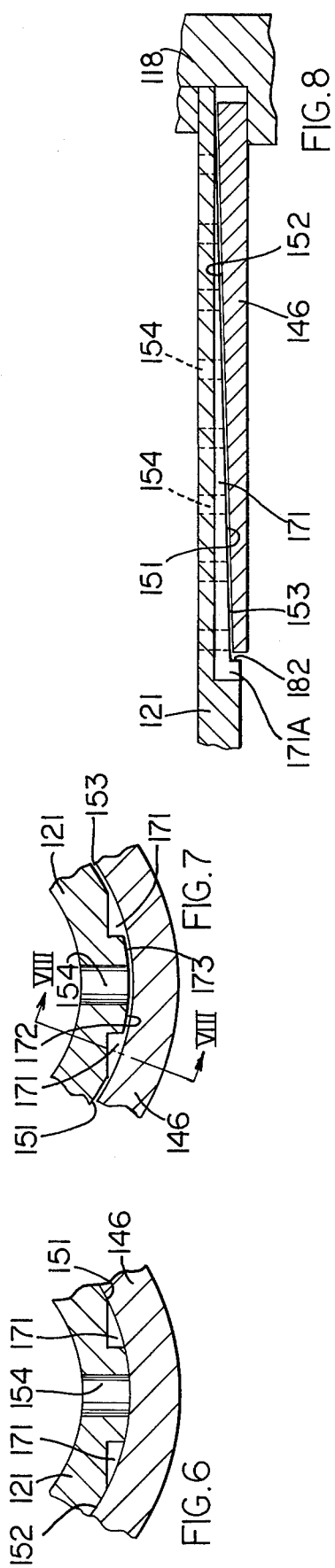

SHOCK ABSORBER WITH CONICAL CONTROL ELEMENTS

FIELD OF THE INVENTION

This invention relates generally to energy absorbers and, in particular, to an adjustable hydraulic shock absorber which is capable of being adjusted to absorb shock loads of varying amounts.

BACKGROUND OF THE INVENTION

Energy absorbers have often been customized or built in accordance with the requirements of the particular load conditions under which they were to perform. This is highly undesirable since building a shock absorber for each type of job is costly and time consuming. Further, customized shock absorbers are necessarily of many different sizes and there is generally no standardization among the indiviudal components thereof, thereby making maintenance expensive and difficult.

To overcome the above disadvantage, several energy absorbers have been commercially manufactured which permit the energy absorbing capability thereof to be adjusted in accordance with the expected load conditions, thereby permitting the shock absorber to be utilized in many different loading and environmental conditions. While many of these adjustable energy absorbers have been adaptable to a wide range of load conditions, nevertheless these energy absorbers have not been as widely utilized as the area of need for same might indicate since they have been relatively costly. Specifically, most known adjustable energy absorbers have utilized a complex adjustment structure which is both expensive to manufacture and difficult to use. More specifically, these known shock absorbers have required an excessive amount of precise, and hence costly machining.

Also, many of the known adjustable shock absorbers use concentric, inner and outer control sleeves which are relatively movable for controlling flow between two chambers. However, these sleeves must be machined with extremely precise tolerances and/or machined as a matched pair in order to permit proper fit and operation. This thus prevents random assembly of the parts, and hence substantially increases the cost of assembly.

Accordingly, it is an object of this invention to provide an improved energy absorber, particularly a hydraulic shock absorber, which overcomes the above-mentioned disadvantages. It is also an object of this invention to provide:

1. An improved energy absorber, as aforesaid, capable of being adjusted to absorb shock loads of varying amounts.
2. An energy absorber, as aforesaid, which is easily and precisely adjustable to vary the energy absorption characteristic thereof.
3. An energy absorber, as aforesaid, which permits the energy absorption characteristic to be precisely adjusted to a level compatible with the external load imposed thereon.
4. An energy absorber, as aforesaid, which is capable of absorbing progressively increasing amounts of energy so as to result in a substantially uniform, that is a substantially linear, stopping of a movable load.
5. An energy absorber, as aforesaid, which utilizes a control structure containing inner and outer concentric sleeves with one sleeve having an axially extending row of control openings therethrough, which sleeves have opposed conical surfaces thereon and are relatively axially movable to form a variable width flow control passage therebetween and thereby control the flow of fluid between two compartments so as to adjust the energy absorption capability of the shock absorber.
6. An energy absorber, as aforesaid, which permits the inner and outer control sleeves to be machined with normal tolerances while still permitting random selection of parts during assembly.
7. An energy absorber, as aforesaid, which is simple and compact in construction, economical to manufacture, efficient in operation, and simple to adjust.

Other objects and purposes of this inventon will be apparent to persons acquainted with apparatuses of this type upon reading the following specificaion and inspecting the accompanying drawings.

BRIEF DESCRIPTION OF THE DRAWINGS

FIG. 1 is a central sectional view of an adjustable energy absorber according to the present invention.

FIG. 2 is a fragmentary sectional view taken along the line II—II in FIG. 1.

FIG. 3 is a fragmentary sectional view of the piston assembly and showing the position thereof when the ram is being pushed into the shock absorber.

FIG. 4 is a view similar to FIG. 3 but showing the piston assembly when the ram is being moved outwardly of the shock absorber, in which position the piston functions as an opened one-way check valve.

FIG. 5 is a central sectional view of a further embodiment according to the present invention.

FIG. 6 is an enlarged, fragmentary sectional view taken along the line VI—VI in FIG. 5.

FIG. 7 is a view similar to FIG. 6 but illustrating the inner and outer control sleeves in an open or spaced condition.

FIG. 8 is a fragmentary sectional view taken substantially along the line VIII—VIII in FIG. 7.

Certain terminology will be used in the following description for convenience in reference only and will not be limiting. For example, the words "upwardly", "downwardly", "rightwardly" and "leftwardly" will designate directions in the drawings to which reference is made. The words "inwardly" and "outwardly" will refer to the contraction and extension, respectively, of the reciprocating ram, which contraction and extension occurs when the ram moves rightwardly and leftwardly, respectively, as appearing in both FIGS. 1 and 5. The words "inwardly" and "outwardly" will also refer to directions toward and away from, respectively, the geometric center of the energy absorber and designated parts thereof. Said terminology will include the words above specifically mentioned, derivatives thereof and words of similar import.

SUMMARY OF THE INVENTION

The objects and purposes of the present invention are met by providing an energy absorber having a housing which contains an adjustable sleeve means therein, which sleeve means divides the housing into a pair of fluid chambers. A ram extends from the housing and has a piston slidably received within one of the fluid chambers. The adjustable sleeve means includes inner and outer concentric control sleves which can be selectively axially displaced one relative to the other. One of the sleeves has an axially extending row of control openings extending therethrough. The concentric control sleeves have opposed conical surfaces which can be disposed in substantial engagement with one another to thereby close off the control openings and prevent flow of fluid between the fluid chambers. By relatively axially moving the concentric control sleeves away from this position, so that the opposed conical surfaces are slightly spaced from one another, there is formed a flow control passage between the concentric control sleeves which, in conjunction with the control openings, permits the controlled flow of fluid between the chambers. Imposition of an external force on the ram caused the piston to move axially through the one chamber to force fluid therefrom through the control openings and the control passage into the other chamber, while permitting the fluid to absorb some of the ram energy due to the restricted fluid flow through the control openings and the control passage. The piston progressively closes off the control openings as it moves axially into said one chamber to thereby also control the energy absorption characteristic of the shock absorber. The quantity of energy absorbed by the shock absorber can be selectively adjusted by causing relative axial displacement between the control sleeves to thereby vary the size of the control passage.

DETAILED DESCRIPTION

Referring to FIGS. 1–4, there is illustrated an energy absorber 10, specifically a hydraulic shock absorber, which includes a housing 11 having a ram assembly 12 slidably positioned in and extending therefrom. A flow control sleeve assembly 13 is positioned within the housing for controlling relative movement between the housing 11 and the ram assembly 12 due to the imposition of an external load on the shock absorber. The flow control sleeve means 13 is adjustable, as explained hereinafter, to permit the quantity of energy absorbed by the shock absorber to be selectively varied.

The housing 11 includes a hollow cylindrical sleeve 16 fixedly connected between a pair of end members 17 and 18.

The flow control sleeve means 13 includes an inner cylindrical control sleeve 21 positioned within the housing and extending substantially the full axial length thereof. The sleeve 21 is rotatably received at one end within a bore 22 formed within and extending through the end member 17. The other end of sleeve 21 has a stub shaft 23 fixedly connected thereto, which stub shaft 23 closes off the end of a chamber 27 defined within the control sleeve 21 and projects through an opening 24 formed in the end member 18, whereby stub shaft 23 is rotatably supported on the end member. A retainer ring 26 coacts between stub shaft 23 and end member 18, whereby the stub shaft 23 maintains the sleeve 21 axially fixed with respect to the housing 11.

The ram assembly 12 includes a cup-shaped piston 28 which is snugly and slidably received within the chamber 27, which piston 28 is connected to an elongated piston rod 29 by a threaded bolt 31. The piston rod 29 is slidably and sealingly supported by a bushing 39 which is fixedly positioned within the end of sleeve 21.

The bolt 31 and the cup-shaped piston 28 have suitable clearance passages therein for defining a one-way check valve structure to assist in channelling fluid into the chamber 27 when the ram assembly is being extended, that is, being moved leftwardly in FIG. 1.

Referring to FIGS. 3 and 4, the bolt 31 has an intermediate cylindrical shank portion 32 which extends through a hole 33 formed in the end wall of the piston 28, which hole is of larger diameter than the shank portion so as to define an annular clearance passage 34 therebetween. The shank portion 32 has a length which is greater than the thickness of the bottom wall of the piston 28 so that the piston 28 can move axially relative to the piston rod 29 between the two positions illustrated in FIGS. 3 and 4. When the piston 28 is in its outermost position as illustrated in FIG. 4, there is thus defined a small clearance space or chamber 36 between the piston and the adjacent end of the piston rod 29, which space 36 communicates with a pair of grooves 37 which are formed in the piston and extend axially through the free end thereof. The grooves 37 at their rearward (leftward) ends communicate with a chamber 38 which is formed between the piston 28 and the bushing 39 when the ram assembly is displaced inwardly (rightwardly in FIG. 1) from its fully extended position. The piston 28 also has grooves 35 on the front face thereof which provide communication between the passage 34 and the chamber 27.

As illustrated in FIG. 3, when the ram assembly is being contracted (moved rightwardly in FIG. 1), the piston 28 is moved into abutting engagement with the free end of the piston rod 29. The intermediate chamber 36 between the piston and the piston rod is thus closed off so that passage 34 is isolated from the grooves 37.

The ram assembly 12 has the piston rod 29 thereof projecting outwardly from the housing, which piston rod is provided with an enlarged head 41 fixedly mounted thereon. A compression spring 42 surrounds the piston rod 29 and coacts between the head 41 and a retainer ring 43 for resiliently urging the ram assembly 12 into its outermost or fully extended position as illustrated in FIG. 1. In this fully extended position, the piston 28 abuts against the bushing 39, and the piston 28 abuts against the head of the bolt 31. While the spring 42 has been illustrated as disposed externally of the housing, it will be appreciated that the spring could be positioned within the housing if desired.

The flow control sleeve assembly 13 also includes an outer cylindrical control sleeve 46 disposed concentric with and in surrounding relationship to the inner control sleeve 21. The outer sleeve 46 has one end thereof joined to the housng 11, specifically the end member 18, by means of a threaded connection 47 which normally maintains the outer control sleeve 46 stationary relative to the housing during normal operation of the sock absorber. However, threaded connection 47 permits the outer sleeve 46 to be rotated relative to the housing when adjustment of the control sleeve assembly 13 is desired.

The outer control sleeve 46 is, in the illustrated embodiment, nonrotatably connected to the inner control sleeve 21 by a pair of pins 48 which as fixed to sleeve 46 and project inwardly thereform. The pins 48 extend into axially elongated slots 49 formed on diametrically opposite sides of the inner sleeve 21. This pin-and-slot connection between sleeves 21 and 46 prevents relative rotation therebetween but permits the outer sleeve 46 to be axially displaced relative to the inner sleeve 21 when the complete sleeve assembly 13 is rotated relative to the housing 11.

The control sleeves have opposed conical surfaces formed thereon for controlling the energy absorption characteristic of the shock absorber, and for this purpose the outer control sleeve 46 has an inner conical surface 52 thereon which is disposed opposite and is adapted to be engaged with an outer conical surface 51 as formed on the inner control sleeve 21. The inner and outer conical surfaces 51 and 52, respectively, are of an identical taper, which taper preferably extends at a small angle relative to the longitudinally extending axis A of the shock absorber. In the illustredd embodiment, the taper of the conical surfaces is normally within the range of between 1° and 5°, although the present invention also contemplates the use of a larger angle of taper. The conical surfaces 51 and 52 are maintained in engagement with one another when the sleeve assembly 13 is in its fully closed position, in which positon the outer sleeve 46 is in its leftwardmost position, whereupon the rightward end of sleeve 46 is thus spaced from the end wall of end member 18. However, FIG. 1 illustrates the sleeve 46 in its rightwardmost position whereupon the sleeve assembly 13 is in its fully opened condition so that a maximum annular flow passage 53 is formed between the conical surfaces 51 and 52. This annular flow control passage 53, as formed between the conical surfaces of the control sleeves, communicates with the chamber 27 through an axially extending row of openings 54 as formed in the sidewall of the inner control sleeve 21. The large diameter end of the flow passage 53, that is the leftward end in FIG. 1, communicates with a chamber 56 which is formed within the housing 11 in surrounding relationship to the sleeve assembly 13.

The chamber 56 is in continuous communication with the chamber 38, and for this purpose the end member 17 is provided with a pair of passages or grooves 58 formed therein, which grooves have their rearward ends in communication with openings 59 formed in sleeve 21, which openings communicate with chamber 38.

OPERATION

In an operational position, the energy abosrber 10 is normally maintained with its ram assembly 12 in an extended position as illustrated in FIG. 1 due to the urging of spring 42. The absorber 10 is filled with fluid, such as hydraulic oil, so that the fluid completely fills at least the chamber 27. When so prepared, the energy absorber 10 is in condition for engagement by an apparatus from which energy is to be abosrbed, which apparatus will move the piston rod inwardly into the housing for decelerating the apparatus or absorbing shock blows therefrom.

When an external load or shock blow is imposed on the ram assembly 12, this causes the piston rod 29 to move inwardly into the housing, which in turn causes inward (rightward) movement of the piston 28. During this rightward movement of the piston, the piston is maintained in the position illustrated in FIG. 3 so that the one-way check valve structure formed therein is closed. The inward movement of piston 28 causes pressurization of the fluid contained within the inner chamber 27, which fluid is forced through the openings 54 and through flow passage 53 into the outer chamber 56. As the piston 28 moves axially toward the rightward end of the housng, it sequentially closes off the openings 54, which in turn progressively restricts the further flow of fluid from the chamber 27 into the chamber 56. This thus causes the piston 28 to progressively decelerate so that as the piston approaches the inner end of the chamber 27 (rightward end in FIG. 1), the external shock load imposed on the shock absorber 10 will be substantially dissipated.

During the inward movement of the ram assembly, as explained above, the chamber 38 as formed behind the piston 28 progressively enlarges. This chamber 38 fills with fluid due to its communication with chamber 56 through the passages 58 and openings 59.

When the inward movement of the ram assembly has been stopped and when the external load has been removed from the head portion 41, the ram assembly is returned to its original extended position due to the urging of the spring 42. During this return movement of the ram assembly, the fluid in chamber 38 causes the piston 28 to be moved rightwardly relative to the piston rod 29 so as to assume the position illustrated in FIG. 4, in which position the intermediate chamber 36 is opened so as to permit communication between the passages 34 and 37. This one-way check valve structure as formed by the passages 34–37 thus facilitates the flow of fluid from chamber 38 into chamber 27 as the ram assembly is being returned to its fully extended position. When the ram is fully extended, the openings 62 ensure that the chamber 21 is completely filled with fluid.

As is understood, the deceleration rate of the ram assembly 12 is determined by the quantity and velocity of the fluid escaping from the inner chamber 27 through the openings 54 and passage 53 into the outer chamber 56. To adjust the deceleration rate of the ram assembly 12, and thereby vary the energy dissipating characteristic of the shock absorber 10, the complete sleeve assembly 13 is rotated relative to the housng 11, which rotation can be accomplished by manually turning the hand wheel 61, which hand wheel could also be mounted on the stub shaft 23 if desired. This rotation of the sleeve assembly 13 causes the outer control sleeve 46 to be axially displaced relative to the inner sleeve 21 due to the threaded connection 47. Since the sleeve assembly can be rotated through an arcuate distance equal to several complete revolutions, this thus permits a very fine and precise adjustment in terms of the axial displacement of the outer sleeve 46 relative to the inner sleeve 21, which axial adjustment in turn varies the radial spacing between the conical surfaces 51 and 52 and hence varies the cross-sectional area of the annular flow passage 53.

MODIFICATION

FIGS. 5–8 illustrate therein a preferred embodiment of the invention which incorporates therein many of the structural and operational features possessed by the shock absorber 10 of FIGS. 1–4. Accordingly, the parts of the shock absorber illustrated in FIGS. 5–8 have been designated by the same reference numerals used to designate corresponding parts of the shock absorber illustrated in FIGS. 1–4 except that the reference numerals have been increased by 100.

In the shock absorber 110, the inner control sleeve 121 extends between and is supported on the end members 117 and 118, and the outer control sleeve 146 is disposed concentric with and in surroundng relationship to the inner sleeve 121. Outer sleeve 146 has an inner conical surface 152 thereon which is disposed opposite the outer conical surface 151 formed on the inner sleeve 121, which conical surfaces are adapted to be slightly spaced apart so as to provide a flow control passage 153 therebetween.

In this embodiment, the inner control sleeve 121 is provided with a pair of elongated slots 171 (FIGS. 6 and 7) formed in the outer conical surface 151, which slots 171 extend axially of the sleeve 121 throughout the length of the outer sleeve 146 and terminate in openings 171A (FIG. 8) which communicate with the outer chamber 156. The slots 171 are disposed closely adjacent and on opposite sides of the axially extending row of openings 154, whereby the slots result in the formation of narrow circumferentially extending lands 172 between the row of openings 154 and the adjacent slots 171. These lands 172 are spaced from the opposed inner conical surface 152 and thus define narrow control passages 173 therebetween for controlling the fluid flow from the openings 154 into the slots 171.

The slots 171 are formed in the sleeve 121, as by a milling cutter, such that the bottom wall of each slot extends substantially parallel to the axis A. This results in the cross-sectional area of each slot 171 progressively increasing as the slot extends from the inner or rightward end thereof to the outer or leftward end thereof as illustrated in FIG. 8. The slot 171 is thus effectively of zero cross-sectional area at the rightward end of the control sleeve 146, whereas the slot 171 progressively increases in cross-sectional area so as to have a maximum cross-sectional area adjacent the leftward end of the control sleeve 146.

While FIGS. 6 and 7 illustrate the use of two slots 171, with one being positioned on each side of the row of openings 154, it will be appreciated that the shock absorber 110 could be provided with only a single slot 171 if desired.

The outer control sleeve 146 is axially adjustable relative to the inner control sleeve 121 so as to vary the radial width or dimension or the passages 153 and 173. For this purpose, shock absorber 110 is provided with an adjustment means 114 which includes a knob or handle 176 fixedly secured to the outer end of a control shaft 177, which control shaft is in turn rotatably and sealingly supported on a housing hub 178 so that the control shaft 177 is rotatable about an axis which extends substantially perpendicular to the axis A. Control shaft 177 has a cam or eccentric 179 fixedly secured to the inner end thereof, which eccentric 179 is engaged with an opening or slot 181 formed in the outer control sleeve 146. The eccentric 179 is preferably of circular cross-section and has the axis thereof eccentrically displaced from the axis of the shaft 177, whereby eccentric 179 functions like a crankpin. The slot 181 has a width, as measured in the axial direction of the control sleeve, which substantially corresponds to the diameter of the eccentric 179 so that the eccentric is snugly accommodated therein. However, the length of the slot 181, as measured circumferentially of the control sleeve, is preferably greater than the diameter of the eccentric to thereby compensate for the sideward displacement of the eccentric during rotation of the control shaft 177.

The control shaft 177 is rotatable through a maximum angle of 180°, and preferably less, so as to cause a corresponding rotation of the eccentric 179, which in turn causes axial displacement of control sleeve 146 between two endmost positions. When the adjustment mechanism is in the position illustrated in FIG. 5, in which position the eccentric is in its leftward end position, the outer control sleeve 146 effectively abuts against a stop 182 as formed on the inner control sleeve 121, thereby resulting in a minimum clearance between the conical surfaces 151 and 152 so that the openings 154 are effectively closed. The presence of the stop 182, however, prevents the two conical surfaces 151 and 152 from being lockingly wedged together. When the control knob 176 and eccentric 179 are rotated away from the position illustrated in FIG. 5, then the outer control sleeve 146 is moved axially rightwardly so that the spacing 153 between the conical surfaces 151 and 152 is increased, with the maximum spacing 153 existing when the end of sleeve 146 abuts against the stop surface 188. Rotation of knob 176 thus permits the spacing 153 between the conical surfaces 151 and 152 to be selectively varied and adjusted so as to provide for the desired restricted flow of fluid from the inner chamber 127 into the outer chamber 156 when the ram assembly 112 is moved inwardly into the housing 111.

The shock absorber can be suitably locked in its selected position by means of a set screw 183 which locks the knob 176 to the hub 178 and thereby fixedly maintains the positional relationship between the control sleeves 121 and 146.

The housing has a port 186 associated therewith for permitting filling of the shock absorber with fluid, such as hydraulic oil. After filling, the port 186 is normally closed by means of a conventional plug.

When an external load or shock force is imposed on the ram assembly 112, the piston 128 moves inwardly (rightwardly) into the compartment 127, thereby forcing fluid outwardly through the openings 154. The fluid then flows over the land 172 into the slots 171, since this is the path of least flow resistance. The fluid then flows along the slots 171 and discharges through the ends 171A thereof into the outer chamber 156. The restriction imposed on the fluid flow by the openings 154 and control passages 173 thus absorbs the energy of the apparatus which is impacting against the ram assembly, and accordingly caused a deceleration of the ram assembly.

As the ram assembly moves further into the compartment 127, the piston 128 progressively closes off the openings 154 so that the flow of fluid from chamber 127 into chamber 156 is further progressively restricted, thereby causing a progressive deceleration of the ram assembly as it approaches the rightward end of the shock absorber. This progressive closing of the openings 154, coupled with the flow passage 173 formed between the openings 154 and the slots 171, thus causes a very uniform deceleration and stopping of the ram assembly. Further, since the grooves 171 are of progressively increasing cross-sectional area, they readily accommodate the variable flow therethrough depending upon the number of openings 154 which are uncovered. For example, when the piston 128 is adjacent the leftward end of the shock absorber, a large number of openings 154 are uncovered so that fluid will flow through the openings 154 into the slots 171 along substantially the complete length thereof, whereupon a large quantity of fluid will flow into the slots for passage into the outer chamber 156. This larger quantity of fluid is permitted since the cross-sectional area of the slots 171 progressively increases towards the discharge end of the slots in correspondence with the progressive spacing of the openings axially along the inner control sleeve. On the other hand, when the piston 128 is more closely adjacent the rightward end of the shock absorber, only a few openings 154 are uncovered so that a substantially smaller quantity of fluid flows into the slots 171 for discharge into the outer chamber 176.

It will be appreciated that the adjustment mechanism 114 could be replaced with other suitable mechanisms capable of causing the desired axial movement between the sleeves 121 and 146.

Although a particular preferred embodiment of the invention has been disclosed in detail for illustrative purposes, it will be recognized that variations or modifications of the disclosed apparatus, including the rearrangements of parts, lie within the scope of the present invention.

The embodiments of the invention in which an exclusive property or privilege is claimed are defined as follows:

1. In an adjustable fluid-type energy absorber, comprising:
    housing means including a central tubular housing member and a pair of end members positioned adjacent opposite ends of said central tubular housing member;
    sleeve means disposed in said housing means for forming a first fluid chamber within the interior of said sleeve means and a second fluid chamber between said sleeve means and said tubular housing member;
    ram means slidably disposed on said housing means for receiving a shock load thereon, said ram means including a piston slidably disposed within one of said fluid chambers and a piston rod connected to said piston and extending outwardly from one end of said housing means;
    said sleeve means including a first sleeve member having opening means extending radially therethrough to permit fluid communication between said first and second chambers, said opening means extending substantially axially of said first sleeve member whereby movement of said piston axially of said one chamber causes fluid to flow from said one chamber through said opening means into said other chamber;
    control means for varying the energy dissipation characteristics of said energy absorber, said control means including a second sleeve member disposed substantially adjacent and in concentric relationship with said first sleeve member for controlling the flow through said opening means, one of said sleeve members having an outer conical surface thereon and the other sleeve member having an inner conical surface thereon disposed closely adjacent and opposite said outer conical surface, said inner and outer conical surfaces defining a narrow flow control passage therebetween, said opening means communicating with said flow control passage; and
    adjustment means for causing relative axial displacement between said first and second sleeve members for selectively varying the size of the flow control passage between said inner and outer conical surfaces;
    said adjustment means includes a control shaft rotatably supported on said housing means for rotation about an axis substantially perpendicular to the longitudinally extending axis of said sleeve means, said control shaft extending exteriorly of said housing means and having manually engageable handle means thereon, and eccentric means mounted on said control shaft adjacent the inner end thereof and disposed in engagement with an opening formed in one of said sleeve members for causing axial displacement thereof in response to angular displacement of said control shaft.

2. An energy absorber according to claim 1, wherein said second sleeve member is disposed exteriorly of and surrounds said first sleeve member, wherein said first sleeve member is axially fixed with respect to said housing means, and wherein said eccentric is disposed in engagement with said second sleeve member for moving same axially along said first sleeve member.

3. An energy absorber according to claim 1, further including axially elongated groove means formed in one of said conical surfaces, said groove means being positioned closely adjacent but slightly circumferentially spaced from the axially extending opening means.

4. An energy absorber according to claim 3, wherein said groove means is formed in said first sleeve member and extends axially thereof through a distance at least equal to the axial extent of said opening means, said groove means having at least one end thereof in open communication with said other chamber.

5. An energy absorber according to claim 4, wherein said piston is slidably disposed within said first sleeve member, wherein said second sleeve member is positioned exteriorly of and surrounds said first sleeve member, wherein the exterior surface of said first sleeve member has said outer conical surface formed thereon, whereon the interior surface of said second sleeve member has said interior conical surface formed thereon, and wherein said adjustment means is connected to said second sleeve member for causing axial displacement thereof.

6. In a fluid-type shock absorber, comprising:
    housing means including a central tubular housing member and a pair of end members positioned adjacent opposite ends of said central tubular housing member;
    sleeve means disposed in said housing means for forming a first fluid chamber within the interior of said sleeve means and a second fluid chamber between said sleeve means and said tubular housing member;
    ram means slidably disposed on said housing means for receiving a shock load thereon, said ram means including a piston slidably disposed within one of said fluid chambers and piston rod means connected to said piston and extending outwardly from one end of said housing means;
    opening means associated with said sleeve means for permitting controlled flow of fluid from said one chamber into the other chamber to decelerate the ram means when the piston is moved axially of said one chamber in a first direction;
    a third fluid chamber formed directly behind said piston when same is moving in said first direction, said third chamber being in continuous communication with said other chamber; and
    one-way check valve means associated with said piston for permitting flow fluid therethrough from said third chamber into said one chamber when said piston is moving axially of said one chamber in a second direction which is opposite said first direction, said one-way check valve means preventing flow of fluid from said one chamber directly into said third chamber when said piston is moving in said first direction;

said check valve means including passage means formed in said piston for joining said one chamber and said third chamber, said passage means including an intermediate passage formed between opposed portions of said piston and said piston rod means, said piston being slidably mounted on said piston rod means for limited axial movement between first and second positions, said piston being maintained in said first position when the piston is being moved in said first direction for maintaining said opposed portions in engagement with one another so that said intermediate passage is closed, said piston being automatically moved in said second position when said piston is moved in said second direction so that said opposed portions are spaced from one another whereby said intermediate passage is open to thereby permit fluid flow from said third chamber through said passage means into said one chamber.

7. An energy absorber according to claim 6, wherein said piston is of a cup-shaped configuration and is slidably supported on the inner end of said piston rod means so that said piston rod projects into the interior of the cup-shaped piston, and a threaded fastener secured to the end of said piston rod means for mounting said piston thereon, said threaded fastener having an enlarged head portion spaced from the free end of said piston rod for loosely confining the bottom wall of said piston therebetween for enabling said piston to slidably move between said first and second positions.

8. In a fluid-type energy absorber having a housing, ram means slidably disposed on the housing for receiving a shock load thereon, the ram means including a piston slidably disposed within the housing and connected to a piston rod which extends outwardly from the housing, the piston being normally maintained adjacent one end of the housing, a first sleeve member disposed within the housing and coacting with the piston for forming first and second fluid chambers which are effectively separated from one another, the piston being slidably and sealingly engaged with the first sleeve member, the first fluid chamber being defined at least in part by the first sleeve member and extending between the piston and the other end of said housing, and flow passage means for providing limited fluid flow from said first chamber into said second chamber responsive to axial displacement of said piston into said first chamber, said flow passage means including opening means extending radially through the wall of said first sleeve member and extending axially over a substantial portion of the length of said first chamber, the improvement comprising control means coacting with said first sleeve member and said flow passage means for controlling the flow from said first chamber to said second chamber, said control means including a second sleeve member disposed concentric with said first sleeve member and positioned so that said first sleeve member is disposed between said piston and said second sleeve member, said first and second sleeve members having opposed conical surfaces thereon which are disposed closely adjacent and directly opposite so as to define a narrow flow passageway therebetween, said narrow flow passageway being in communication with said opening means and comprising a part of said flow passage means, and said flow passage means including elongated groove means formed in the conical surface of one of said sleeve members and extending substantially axially of said one sleeve member for communication at one end thereof with said second fluid chamber, said groove means being adjacent but circumferentially displaced by a preselected distance from said opening means and communicating therewith by said narrow flow passageway, whereby said narrow flow passageway restricts the flow of fluid from said opening means to said groove means whereby the flow from said first chamber to said second chamber is thereby controlled.

9. An energy absorber according to claim 8, wherein said second sleeve member in the arcuate extent thereof between said opening means and said groove means is free of openings extending radially through the wall thereof, and wherein said groove means has a radial depth less than the radial thickness of the wall forming said one sleeve member.

10. An energy absorber according to claim 9, wherein said groove means includes a pair of substantially parallel grooves extending axially of said one sleeve member, said grooves being circumferentially displaced said preselected distance on opposite sides of said opening means.

11. An energy absorber according to claim 9, wherein said groove means is formed in said first sleeve member and communicates with the conical surface formed on said first sleeve member.

12. An energy absorber according to claim 11, wherein said piston is slidably disposed within said first sleeve member, wherein said first chamber is defined within said first sleeve member and extends axially between said piston and the other end of said housing, and wherein said second sleeve member surrounds said first sleeve member.

13. An energy absorber according to claim 8, wherein said second chamber includes at least a portion thereof disposed between said piston and said one end of the housing as said piston moves inwardly into said first chamber in response to application of an external load on said ram means, and one-way check valve means associated with said piston for providing flow from said portion into said first chamber as said piston is being moved toward said one end of said housing, said one-way check valve means preventing flow therethrough from said first chamber directly into said portion when said piston is being moved toward the other end of said housing.

14. An energy absorber according to claim 13, wherein said second chamber includes a second portion disposed between said first sleeve member and said housing, said second portion being annular and positioned in surrounding relationship to said first sleeve member, said first sleeve member having connecting passage means formed therein for providing communication between said first-mentioned portion and said second portion, and further passage means providing direct communication between said first and second chambers only when said piston is in its fully retracted position and is disposed adjacent said one end of said housing, said further passage means including a flow passage formed in said first sleeve member and communicating with said first chamber directly adjacent the face of said piston when the latter is in its fully retracted position.

15. An energy absorber according to claim 8, including adjustment means for causing relative axial displacement between said first and second sleeve members for selectively varying the size of the narrow flow passageway defined between said conical surfaces, said adjustment means including locking means associated therewith for selectively fixedly securing the first and second sleeve members in a selected axial position with respect to one another.

16. An energy absorber according to claim 8, wherein said opening means includes a plurality of openings which extend radially through said first sleeve member and are axially spaced a preselected distance apart along a row which extends axially of said first sleeve member, wherein said groove extends axially parallel to said row and is circumferentially displaced therefrom, and wherein said groove is of progressively increasing cross-sectional area as it extends toward an end of the respective conical surface, the end of said groove which is of largest cross-sectional area being in communication with said second chamber.

17. In a fluid-type energy absorber having a housing defining first and second fluid chambers and a ram projecting outwardly of said housing and adapted to have an external load imposed thereon, said ram having a piston slidably disposed within said housing for causing controlled flow of fluid from said first chamber into said second chamber in response to imposition of an external load on said ram which causes slidable displacement of said piston within said housing, comprising the improvement wherein said housing includes a first axially elongated sleeve member which has said piston slidably disposed therein and is closed at one end thereof, whereby said first chamber is defined within said first sleeve member axially between said piston and the closed end of said first sleeve member, said first sleeve member having opening means extending radially therethrough to permit fluid to flow from said first chamber into said second chamber, said opening means extending substantially axially of said first sleeve member whereby movement of said piston axially of said first chamber causes fluid to flow from said first chamber radially outwardly through said opening means for supply to said second chamber, a second axially elongated sleeve member disposed concentric with and in surrounding relationship with said first sleeve member, said first and second sleeve members having opposed conical surfaces thereon which are disposed closely adjacent and opposite one another and define a narrow flow control passageway therebetween, said opening means communicating directly with said narrow flow control passageway, said narrow flow control passageway providing communication between said opening means and said second chamber, said second sleeve member being free of openings extending radially therethrough at least over the axial extent of said opening means so that the flow of fluid from said first chamber into said second chamber is regulated by said narrow flow control passageway, and adjustment means for causing relative axial displacement between said first and second sleeve members for selectively varying the size of said narrow flow control passageway, said adjustment means including means associated therewith for axially fixing said first and second sleeve members together in a preselected position to prevent relative axial displacement between the sleeve members during operation of the energy absorber.

* * * * *